(12) United States Patent
Klein et al.

(10) Patent No.: US 9,216,863 B2
(45) Date of Patent: Dec. 22, 2015

(54) METHOD AND TRANSFER DEVICE FOR TRANSFERRING A TUBE IN A TUBE FILLING MACHINE

(75) Inventors: Stephan Klein, Karlsruhe (DE); Thomas Behringer, Bietigheim (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 167 days.

(21) Appl. No.: 14/111,544

(22) PCT Filed: Apr. 24, 2012

(86) PCT No.: PCT/EP2012/001741
§ 371 (c)(1),
(2), (4) Date: Oct. 12, 2013

(87) PCT Pub. No.: WO2012/150007
PCT Pub. Date: Nov. 8, 2012

(65) Prior Publication Data
US 2014/0037416 A1    Feb. 6, 2014

(30) Foreign Application Priority Data
Apr. 30, 2011    (DE) .......................... 10 2011 100 120

(51) Int. Cl.
| | | |
|---|---|---|
| *B65G 47/91* | (2006.01) | |
| *B65G 47/90* | (2006.01) | |
| *B65B 43/42* | (2006.01) | |
| *B65B 43/60* | (2006.01) | |

(Continued)

(52) U.S. Cl.
CPC ............. *B65G 47/904* (2013.01); *B65B 35/18* (2013.01); *B65B 43/42* (2013.01); *B65B 43/46* (2013.01); *B65B 43/60* (2013.01); *B65G 47/915* (2013.01); *B65B 3/16* (2013.01)

(58) Field of Classification Search
CPC .. B65G 47/904; B65G 47/915; B65G 47/918; B65G 43/42; B65G 43/46; B65G 43/60; B65G 43/62; B65G 69/0075; B65G 69/0083
USPC ............ 414/729, 737, 736, 413, 421, 226.01, 414/225.01
See application file for complete search history.

(56) References Cited

U.S. PATENT DOCUMENTS

| | | | |
|---|---|---|---|
| 3,240,359 A * | 3/1966 | Ruesch et al. ................ | 414/739 |
| 7,156,219 B2 * | 1/2007 | Voigtmann et al. ...... | 198/377.04 |

(Continued)

FOREIGN PATENT DOCUMENTS

| | | |
|---|---|---|
| DE | 78 16 896 | 9/1978 |
| DE | 35 25 447 | 1/1986 |

(Continued)

*Primary Examiner* — Gerald McClain
(74) *Attorney, Agent, or Firm* — Paul Vincent

(57) ABSTRACT

For the purpose of transferring a tube in a tube filling machine between a staging location and a set-down location, the tube at the staging location is gripped at its lateral surface by a holding device and transported by a transfer device to the set-down location where it is set down while simultaneously being rotated about its longitudinal axis or about an axis parallel thereto during transport. Such a transfer device has a multiple-member articulated arm, which has at least one 1st arm member that is mounted to pivot about a rotary axis and directly or indirectly pivotably supports at least one holding member. The holding member carries at least one holding device by means of which the tube can be picked up and which can be pivoted about an axis that is parallel to the longitudinal axis of the tube or that coincides therewith.

8 Claims, 12 Drawing Sheets

(51) Int. Cl.
*B65B 43/46* (2006.01)
*B65B 35/18* (2006.01)
*B65B 3/16* (2006.01)

(56) References Cited

U.S. PATENT DOCUMENTS

| | | | |
|---|---|---|---|
| 7,610,735 B2 * | 11/2009 | Monti | 53/53 |
| 8,172,498 B2 * | 5/2012 | Enenkel | 414/421 |
| 2004/0141833 A1 * | 7/2004 | Shackelford et al. | 414/222.01 |

FOREIGN PATENT DOCUMENTS

| | | |
|---|---|---|
| DE | 35 27 850 | 2/1986 |
| DE | 35 04 233 | 11/1986 |
| DE | 37 20 638 | 1/1988 |
| DE | 91 03 815 | 7/1991 |
| DE | 295 01 129 | 4/1996 |
| DE | 600 06 531 | 11/2000 |
| DE | 10 2005 013 641 | 9/2006 |
| WO | WO 2009/131519 | 10/2009 |

* cited by examiner

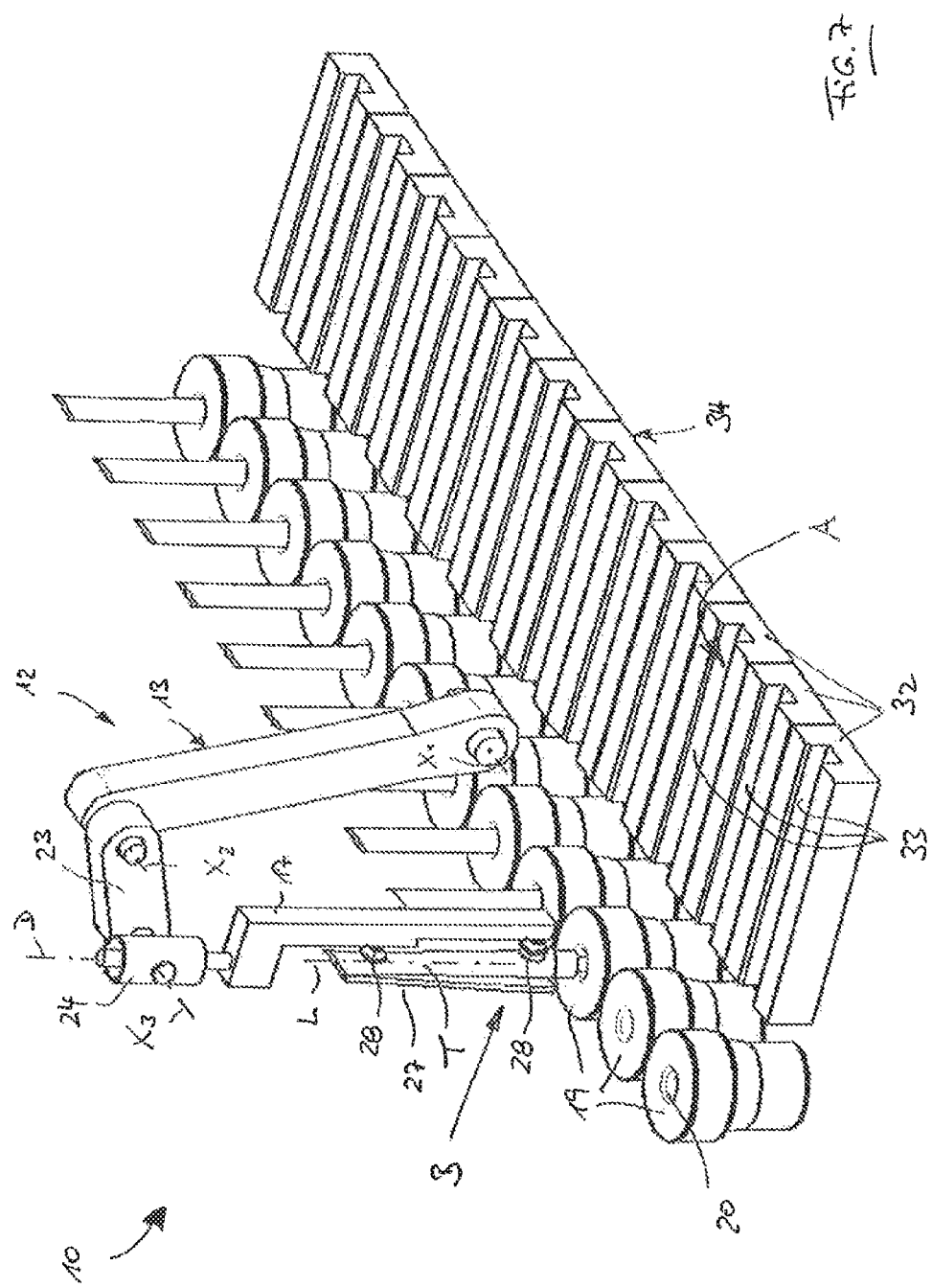

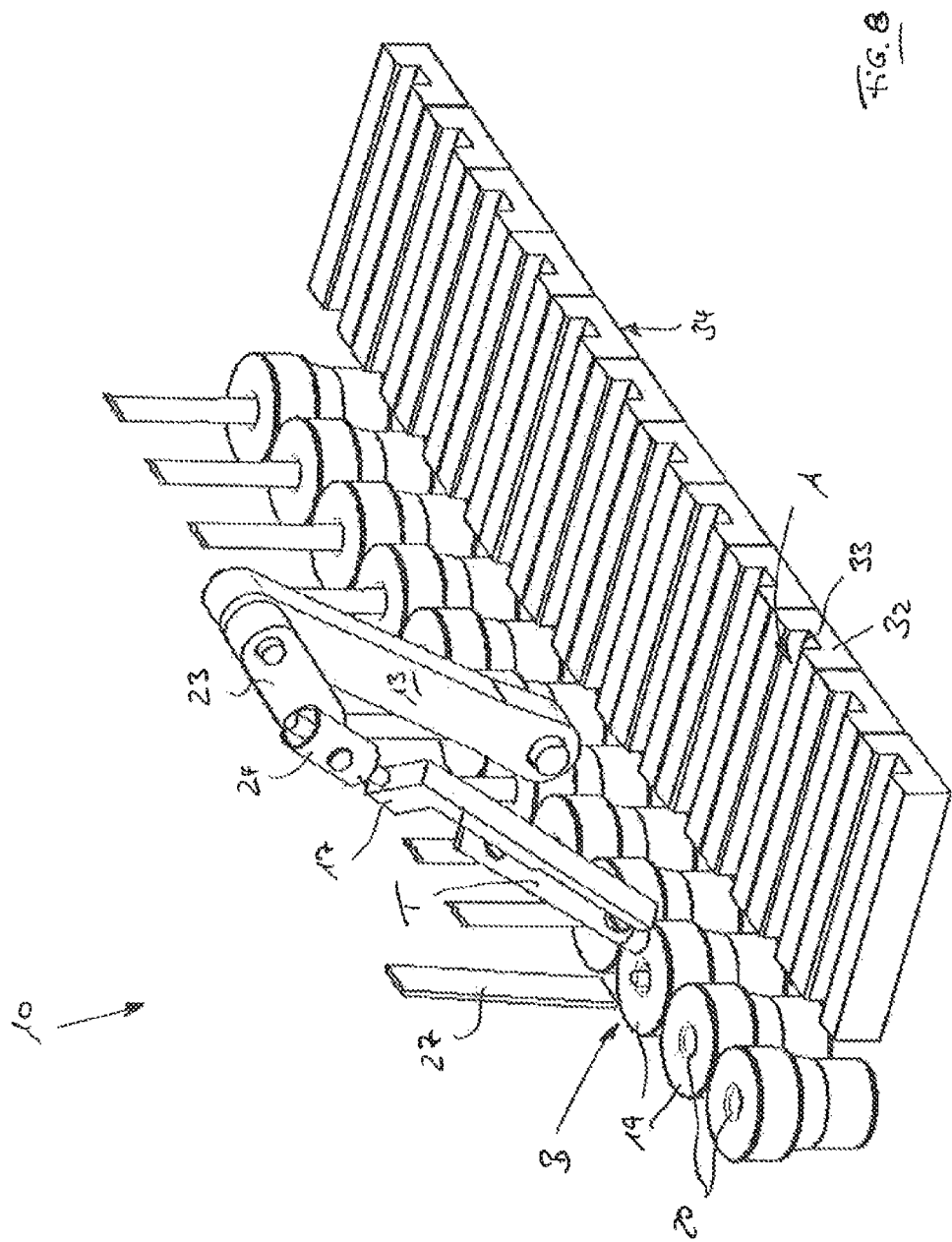

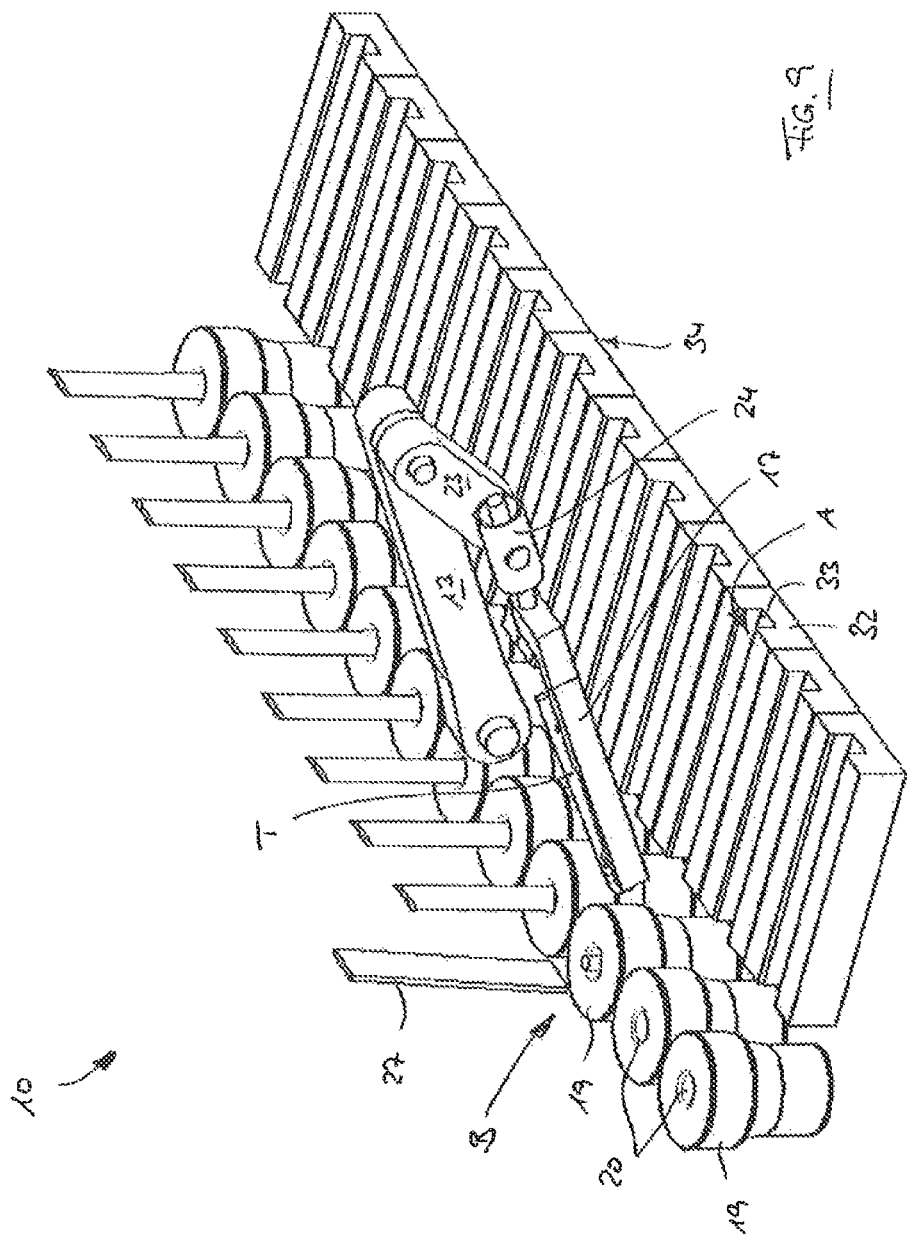

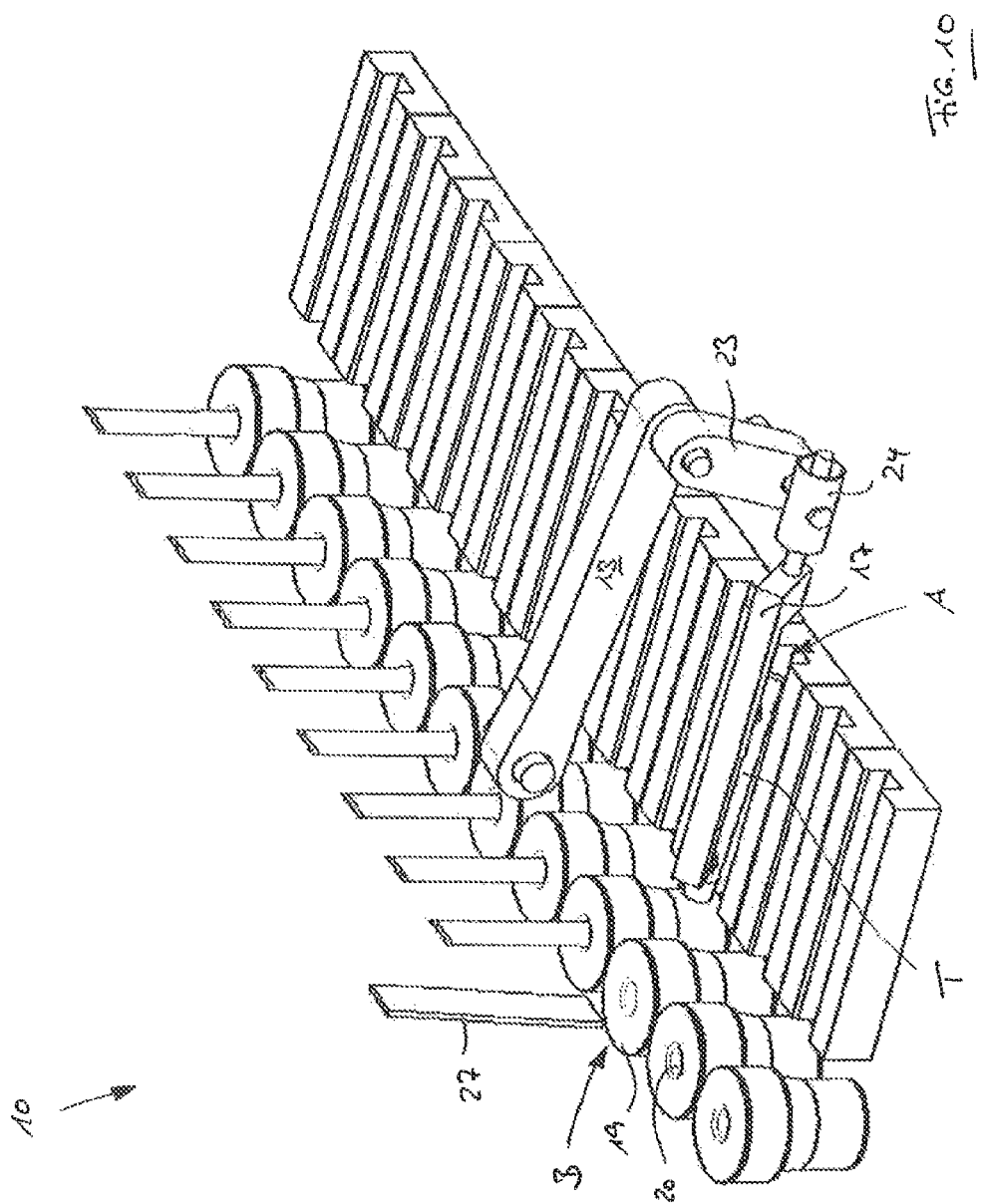

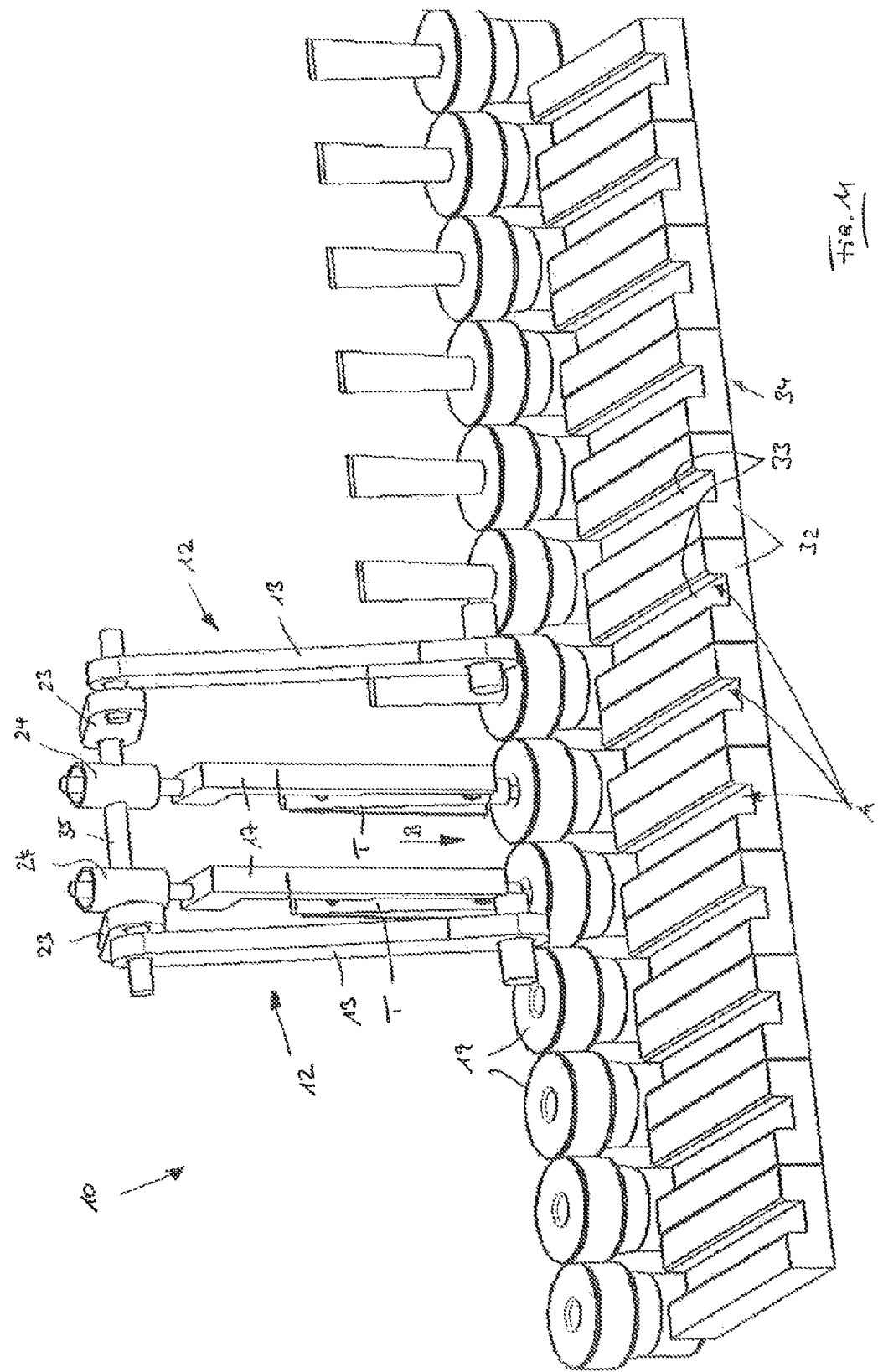

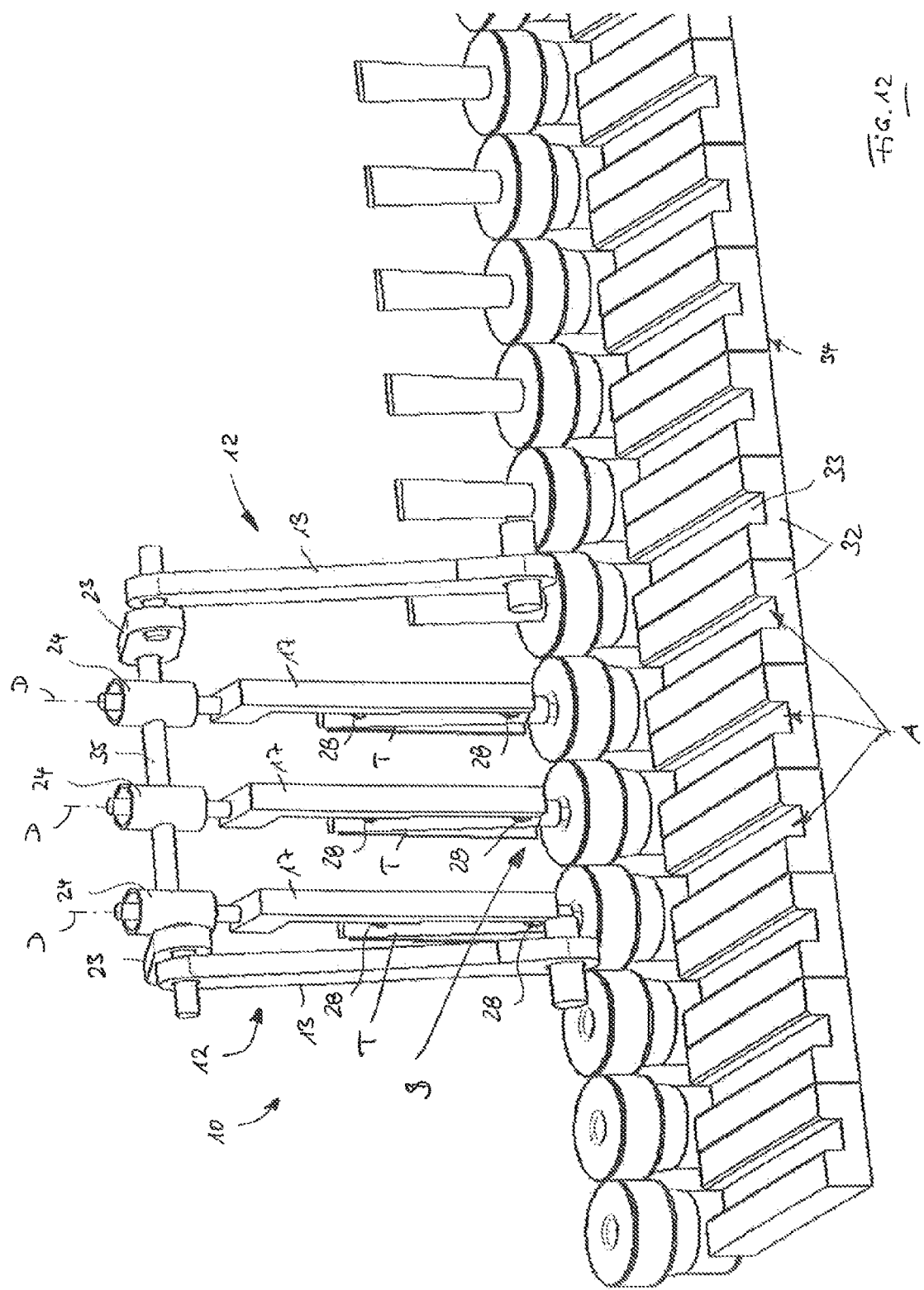

METHOD AND TRANSFER DEVICE FOR TRANSFERRING A TUBE IN A TUBE FILLING MACHINE

This application is the national stage of PCT/EP2012/001741 filed on Apr. 24, 2012 and also claims Paris Convention priority of DE 10 2011 100 120.8 filed Apr. 30, 2011.

BACKGROUND OF THE INVENTION

The invention relates to a method for transferring a tube in a tube filling machine between a staging location and a set-down location, as well as a transfer device, in particular, to perform the method.

In a tube filling machine, empty or filled tubes have to be transferred at multiple locations. For example, empty tubes, which are staged in a so-called endless row, each have to be individually inserted into a tube holder by passing through various working stations of the tube filling machine. The filled and sealed tube must subsequently be removed from the tube holder and placed on a conveyor device, with which it is conveyed to further work stations, for example, of a downstream carton packaging machine.

The insertion of an empty tube into a tube holder is described below by way of example. The tubes are conveyed in an endless row in an orientation that is transverse with respect to the direction of motion. The 1st tube of the series reaches a staging location, which is formed by a shell-like receptacle. The tube slips, in particular, due to its own weight, into the receptacle, where it is secured. The receptacle containing the tube then swivels from a horizontal orientation into a vertical orientation, wherein the tube is clamped against a surface of a set-down location. In this vertical orientation, the tube is located above a tube holder into which it is then pushed or pressed from above. As soon as the tube is released, the shell-like receptacle swivels back into its horizontal orientation at the staging location, after which the next tube enters the shell-like receptacle.

A disadvantage of this design is that the device is relatively slow because the shell-like receptacle is occupied for a relatively long time by the tube to be inserted and the next tube can only enter the staging location when the shell-like receptacle has swiveled back to the staging location and entered its pick-up position. Furthermore, a special structure must prevent the tube of the endless row from advancing to the staging location when the shell-like receptacle is not at that location. A blocking device is needed for this, which must be enabled only when the controller has ascertained that the shell-like receptacle is located in its required position at the staging location. Such a structure is expensive and prone to malfunction.

The object of the invention is to provide a method for transferring a tube in a tube filling machine, with which the tubes can be transferred between the staging location and the set-down location in a rapid and simple manner. Furthermore, a transfer device is to be provided with which the method can be performed in a simple manner.

SUMMARY OF THE INVENTION

The object is achieved in respect of the method by the characteristics of the independent claim. Therein the tube at the staging location is gripped around its lateral surface by a holding device and transported by a transfer device to the set-down location where it is set down while simultaneously being rotated about its longitudinal axis or about an axis parallel thereto during transport.

Inventively, the basic idea is to grip the tube by means of the holding device at the staging location, lift it from the staging location and transport it to the set-down location while pivoting it about its longitudinal axis or about an axis parallel thereto. As soon as the tube has been removed from the staging location, the next tube can be staged.

The holding device preferably grips the tube at at least two zones spaced apart in the longitudinal direction. This ensures that the tube is securely fastened. The holding device preferably comprises a plurality of suction elements, which contact the lateral surface of the tube, as a result of which the tube is suctioned tightly and securely attached by the application of negative pressure.

While being transported between the staging location and the set-down location and in addition to being rotated about its longitudinal axis or about the axis parallel thereto, the tube is preferably also pivoted about a rotary axis, for example, through 90°. As a result of this overlaid movement, the motion path of the tube can be optimally adapted to the existing installation area of a packing machine and it can be ensured that the tube arrives at the set-down position in the required orientation.

The rotary axis preferably extends perpendicularly relative to the longitudinal axis of the tube or to the axis parallel thereto.

In one possible embodiment of the invention, the tube lies in a horizontal orientation at the staging location, is picked up, and then positioned upright and deposited in a vertical orientation at the set-down location. In particular, the tube can be held above a tube holder at the set-down location and pushed into the tube holder from above.

In a preferred embodiment of the invention, the tube is held at the set-down location by means of a suction device. As soon as the transfer device has positioned the tube at the set-down location, the tube is held at the set-down location in the vertical orientation by means of the suction device. The holding device can then already release the tube and return to the staging location to pick up the next tube.

A tube is preferably picked up from the staging location in such a way that the holding device and/or suction elements are placed on the horizontally oriented tube from above and thus act on the upper side of the tube.

In an alternative embodiment of the invention, the tube is picked up in a vertical orientation at the staging location and placed at the set-down location in a horizontal orientation. Such a procedure is necessary, in particular, if the filled tube is to be removed from the tube holder in which it has been held in vertical orientation in order to be placed on a downstream conveyor belt. The tube is preferably placed on the downstream conveyor belt, which constitutes the set-down location, by applying the holding device or suction element to the upper side of the tube at the set-down location, to place the tube onto the conveyor belt from above.

The object is achieved in respect of the device by means of a transfer device for transferring a tube in a tube filling machine, which has a multiple-member articulated arm, which has at least one 1st arm member that is mounted such that it can pivot about a rotary axis and directly or indirectly pivotably supports at least one holding member, wherein the holding member carries at least one holding device, by means of which a tube can be picked up, and wherein the holding member can be pivoted about an axis that is parallel to the longitudinal axis of the tube or about an axis that coincides with it. Constitution of the transfer device as a multiple-member articulated arm ensures a stable, sustainable structure, while, with suitable adjustment and rotation of the arms relative to one another, enabling very good adaptation to the geometry of the tube filling machine, i.e. to the relative position of the staging location and of the set-down location.

A first, structurally relatively simple embodiment comprises only one 1st arm member, which is pivoted back and forth between two positions. On the 1st arm member, at least one holding member is mounted, which holds the holding device for the tubes and, in particular, the suction elements. The holding member can be pivoted relative to the 1st arm member in such a way that pivoting the holding member results in the rotation of a tube held at the holding member about its longitudinal axis and/or an axis extending parallel thereto.

If the tube to be picked up is in the horizontal orientation on the staging location, the suction elements of the holding member are placed onto the lateral surface of the tube from above and then activated, wherein the tube is suctioned tightly and held in position. The 1st arm member of the multiple-member articulated arm then rotates, lifting the tube from the staging location and transporting it to the set-down location. During this transport movement, the holding member pivots relative to the 1st arm member in such a way that the tube can be placed or clamped against a vertical resting surface at the set-down location.

If the installation area available in the tube filling machine is not sufficiently large for such a simple pivot movement, it may be necessary to dispose at least a 2nd articulated member mounted in an articulated manner between the 1st arm member and the holding member. Due to the relative adjustment between the 1st arm member, the 2nd arm member, and the holding member, even relatively complicated curves for the transport movement of the tube can be achieved.

In a preferred embodiment of the invention, the holding device of the holding member with which the tube is picked up can be constituted by at least two suction elements disposed, in particular, spaced apart in the longitudinal direction of the tube.

The transfer device can only return from the set-down location to the staging location where it picks up a further tube when the transported tube is securely positioned at the set-down location. For this purpose, a suction device can be disposed at the set-down location, with which the tube can be secured at the set-down location.

In a simple embodiment of the transfer device, the tubes are individually transferred between the staging location and the set-down location. However, it is also possible to transfer 2, 3, or more tubes simultaneously in a single motion cycle. For this purpose, the transfer device can comprise multiple holding members, which each carry a holding device for picking up a tube. The holding members are preferably all swivel-mounted on the same arm member and can be aligned in parallel. In particular, the movement of the holding members is synchronized with respect to the 1st arm member.

BRIEF DESCRIPTION OF THE DRAWING

Further details and characteristics of the invention can be extracted from the following description of an example with reference to the drawing. The figures show:

FIG. 7 a 2nd embodiment of an inventive transfer device while picking up a tube;

FIG. 8 the transfer device according to FIG. 7 in a 1st transfer phase of the tube;

FIG. 9 the transfer device according to FIG. 8 in a 2nd transfer phase of the tube;

FIG. 10 the transfer device according to FIG. 7 while depositing the tube;

FIG. 11 a 1st alternative embodiment of the transfer device according to FIG. 7; and FIG. 12 a 2nd alternative embodiment of the transfer device according to FIG. 7.

DESCRIPTION OF THE PREFERRED EMBODIMENT

Figure 1:
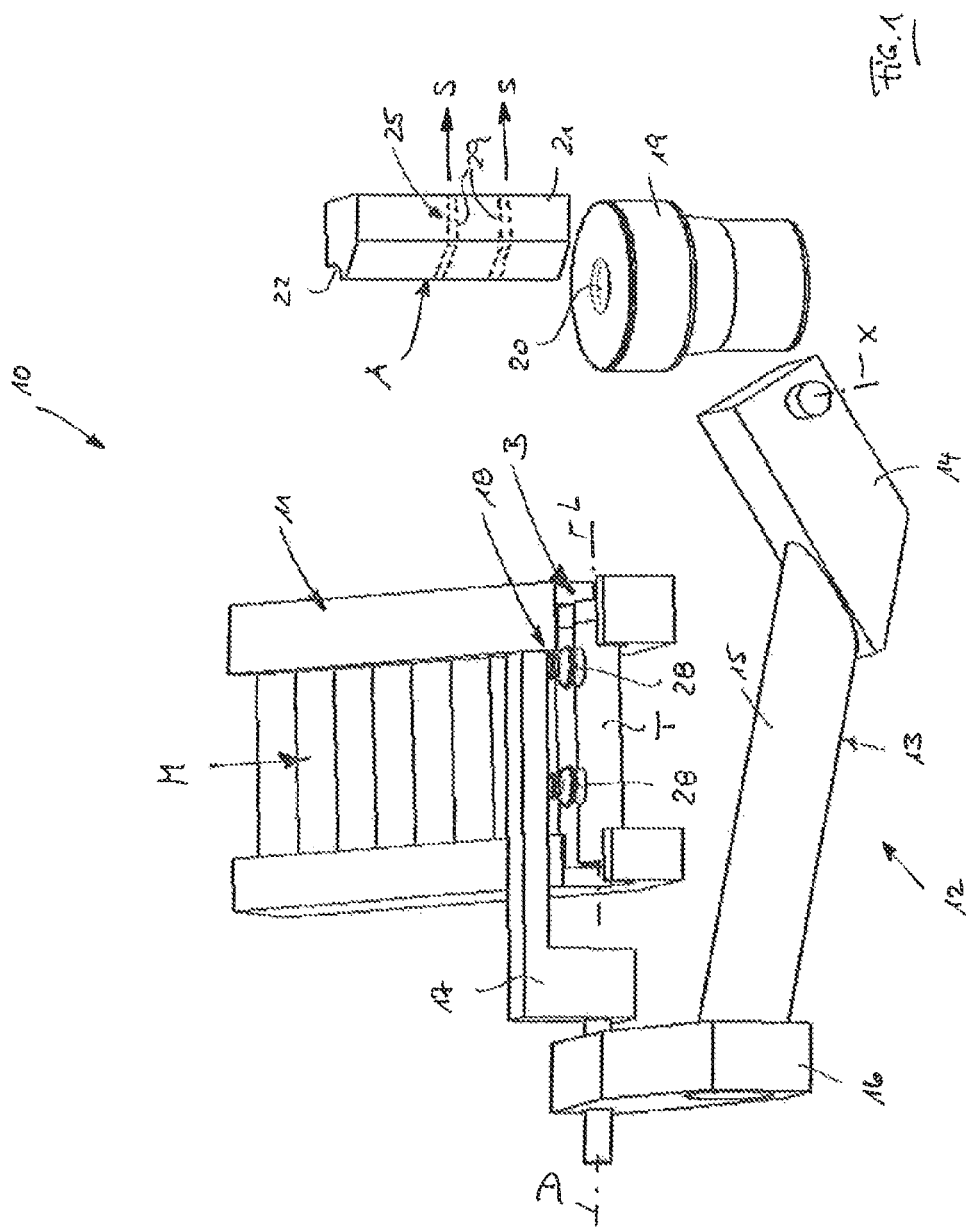
FIG. 1 a schematic view of an inventive transfer device while picking up a tube.

A transfer device 10 shown in FIG. 1 is used to transfer a tube T in a tube filling machine between a staging location B and a set-down location A. The tubes T are fed in an endless row and oriented transverse with respect to the conveying direction M in an obliquely disposed guidance duct 11, which has a staging location B constituted at its lower end, on which the 1st tube T of the tube row lies. The transfer device 10 comprises an articulated arm 12, which has a 1st arm member 13, which is swivel-mounted about a rotary axis X at its right, lower end as shown in FIG. 1. In the depicted example, the 1st arm member comprises a basic part 14, a connecting part 15, and head part 16, which are non-detachably connected to one another. The rotary axis X is constituted on the basic part 14. A bow-like holding member 17 is attached in an articulated manner to the opposite end of the 1st arm member 13, i.e. to the head part 16, which can be pivoted relative to the head part 16 about an axis D. The axis D extends perpendicularly with respect to the rotary axis X.

A holding device 18 in the form of two suction elements 28, disposed spaced apart from each other, to which negative pressure can be applied in a manner not depicted here, is mounted on the holding member 17.

The set-down location A is disposed on a vertically aligned resting block 21, which comprises a vertical resting surface 22. A suction device 25 is integrated into the resting block 21, which comprises internal suction ducts 25, which open out onto the resting surface 22 and to which negative pressure can be applied, as is shown by the arrows S.

Below the set-down location A is a tube holder 19, which has an insertion hole 20 in the usual manner on its upper side.

The transfer of a tube T in individual phases is explained below by means of FIGS. 1, 2, 3, and 4. In the initial condition shown in FIG. 1, the tube T to be transferred lies in the horizontal orientation on the staging location B. The articulated arm 12 is set in such a way that the holding member 17 with the suction elements 28 is located directly above the tube T and the suction elements 28 make contact with the upper side of the tube along its lateral surface. The tube T is oriented in such a way that its longitudinal axis L either coincides with the axis D, about which the holding member 17 pivots, or extends parallel thereto. The suction elements 28 are spaced apart in the longitudinal direction of the tube T.

Figure 2:
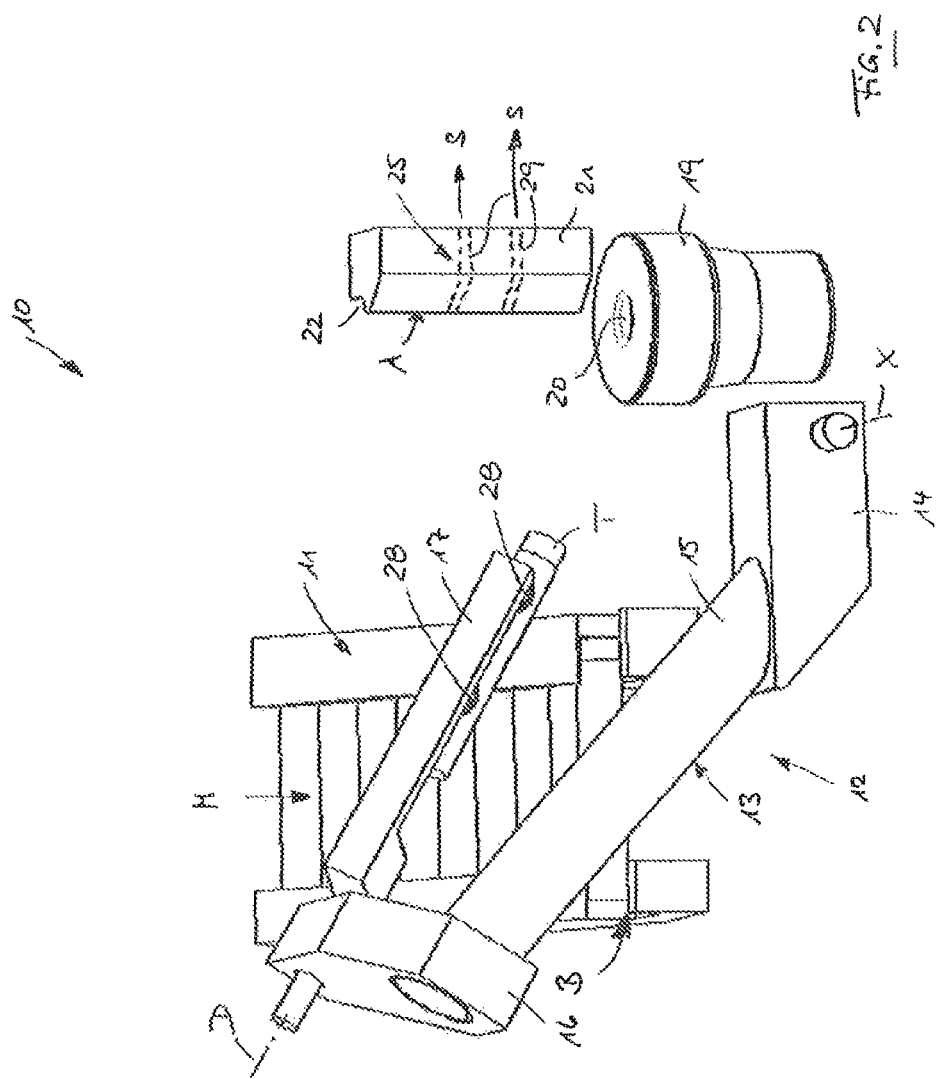
FIG. 2 the transfer device according to FIG. 1 during a 1st transfer phase of the tube.
Figure 3:
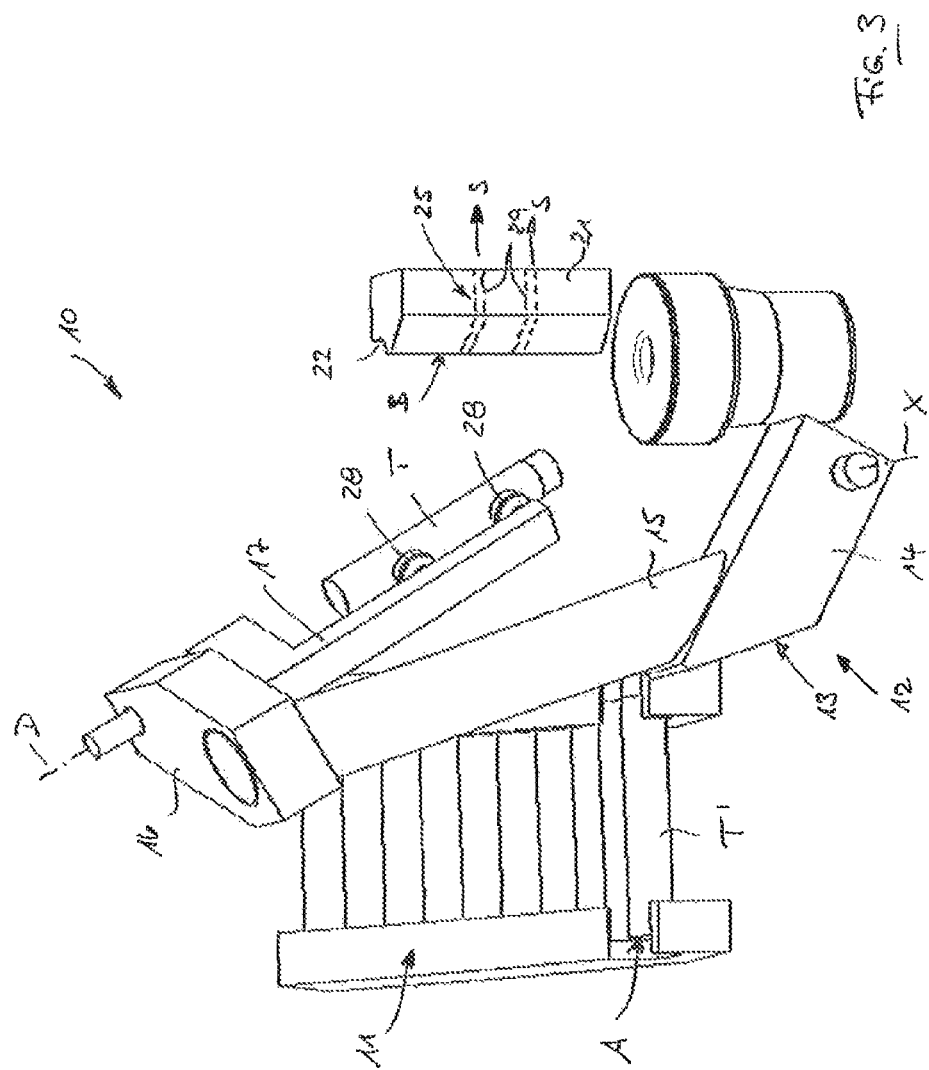
FIG. 3 the transfer device according to FIG. 1 during a 2nd transfer phase of the tube.
Figure 4:
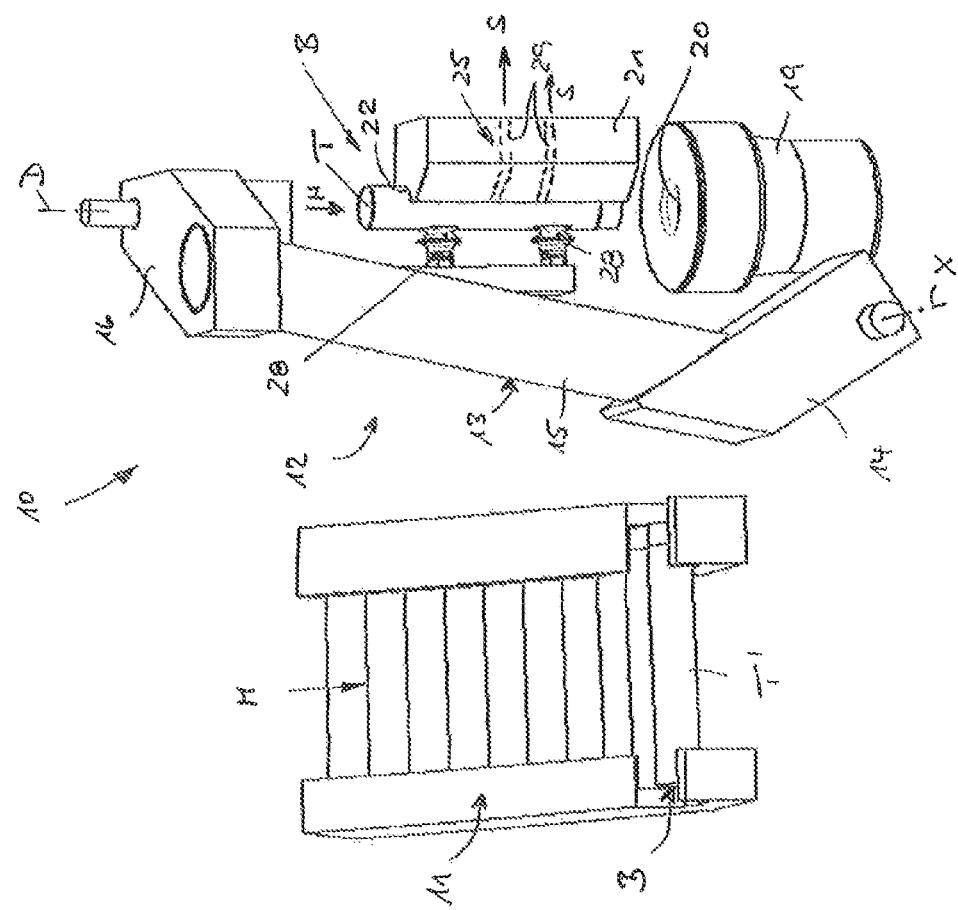
FIG. 4 the transfer device according to FIG. 1 while setting down the tube.

When negative pressure is applied to the suction elements 28, the suction elements 28 pick up the tube T. The articulated arm 12 is thereupon pivoted about the axis X, wherein a simultaneous pivot movement of the holding member 17 about the axis D occurs. A 1st phase of this movement is shown in FIG. 2. As the pivot movement of the articulated arm 12 about the X axis and the rotation of the holding member 17 and thus of the tube T about the axis D continues, the tube T is brought closer to the set-down location A (FIG. 3). During this movement, the tube T is aligned in such a way that it is positioned by the articulated arm 12 against the vertical resting surface 22 of the resting block 21. This position is shown in FIG. 4. Because negative pressure is applied to the suction ducts 29, the tube T is held in position on the resting surface 22. The suction elements 28 can then release the tube T and return to the staging location B, where the next tube T' is already waiting to be picked up.

A pressing force N is then applied from above (in a manner not described in any more detail) to the tube T held at set-down location A, with which the tube T is inserted from above into the insertion hole 20 of the tube holder 19.

Figure 5:
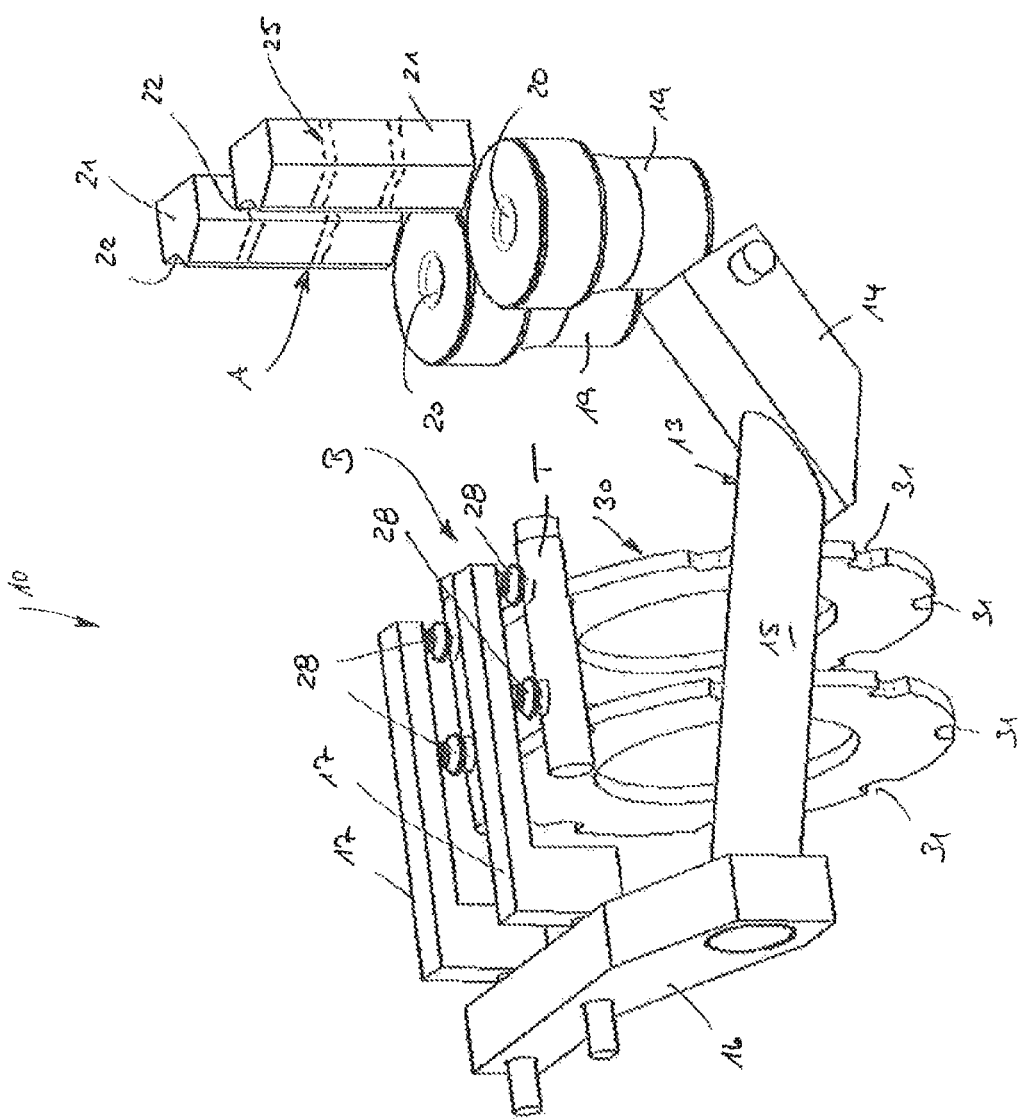
FIG. 5 a 1st alternative embodiment of the transfer device according to FIG. 1.

In the example shown in FIGS. 1 to 4, the tubes are transferred singly and one after the other. FIG. 5 shows an embodiment in which two tubes T are transferred simultaneously. For this purpose, two identically constructed holding members 17 are disposed on the head part 16 of the 1st arm member 13, each of which hold two suction elements 28 disposed and aligned in the manner stated above, and each of which can be pivoted about a rotary axis. Accordingly, two resting blocks 21, each comprising a resting surface 22 and two tube holders 19, are provided at the set-down location A.

The tubes are fed via a pair of disks 30, wherein each disk has several recesses 31 distributed around its circumference. By means of this known conveyor device, it is possible to stage two tubes T aligned parallel and disposed spaced apart from each other and transverse with respect to their longitudinal axis at the staging location B, so that the tubes T are simultaneously picked up by the two holding members 17, that is, by the suction elements 28 mounted on them.

Subsequent transfer movement of the tubes T to the set-down location A is performed in the manner already described.

Figure 6:
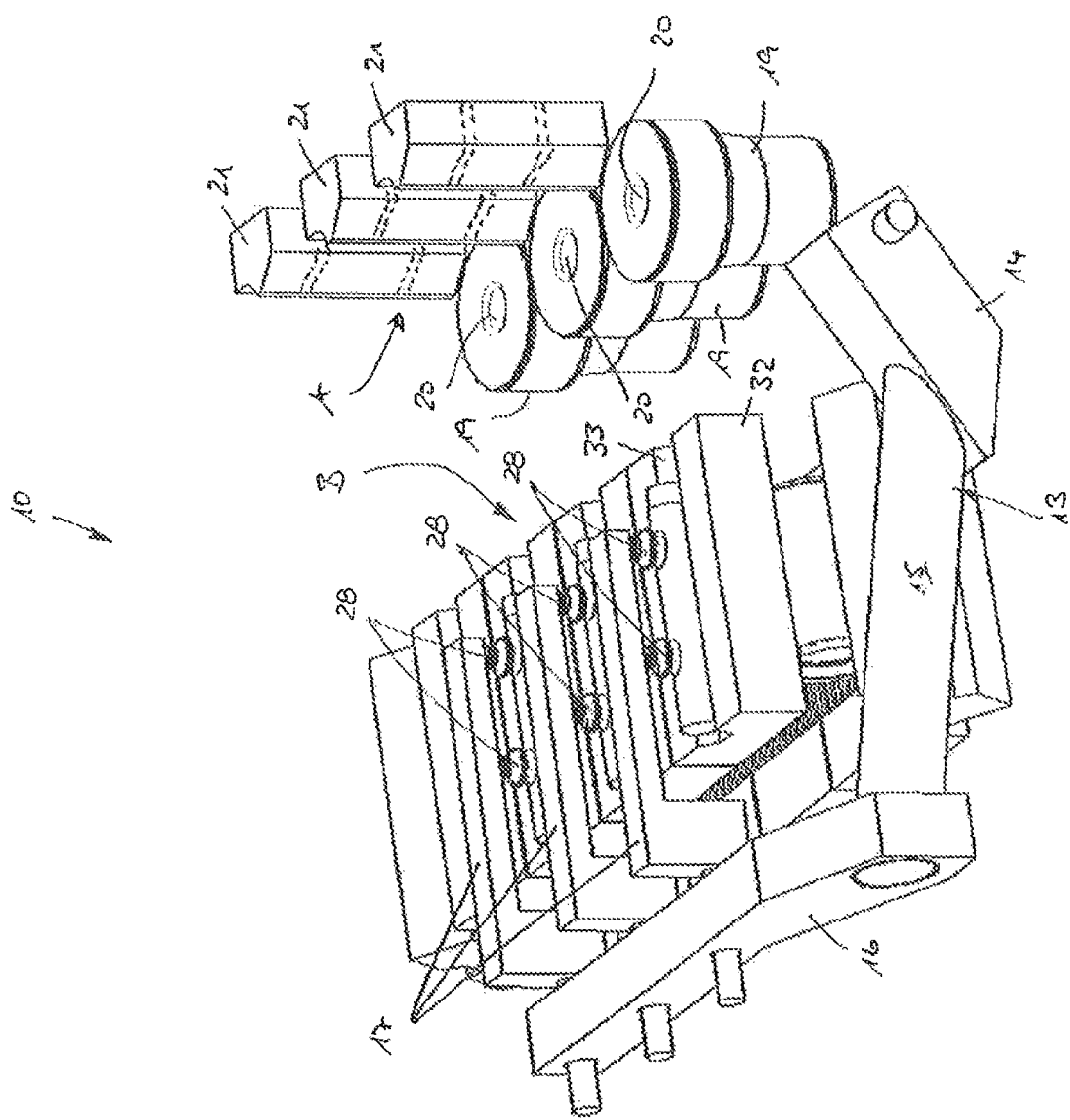
FIG. 6 a 2nd alternative embodiment of the transfer device according to FIG. 1.

FIG. 6 shows an example in which three tubes are picked up simultaneously. Accordingly, three parallel holding members 17 are mounted on the head part 16 in such a way that they rotate and three resting blocks 21 and three tube holders 19 are provided at the set-down location A. In this embodiment, the tubes are fed by means of a rotating endless conveyor, which comprises a plurality of resting parts 32 disposed behind each other, each of which has a slot 33 into which a tube can be placed. In this way, it is possible to feed and stage the tubes oriented parallel and disposed mutually spaced apart at the staging location B. Subsequent transfer of the tubes T is performed in the manner already described.

In previous examples, the tube was picked up at the staging location B in a horizontal orientation and deposited at the set-down location A in a vertical orientation. FIG. 7 shows an embodiment in which the tube T to be transferred is in the vertical orientation at the staging location B.

In the case of the transfer device 10 according to FIG. 7, the tubes to be transferred are fed in an endless row in tube holders 19, having upper insertion holes 20 into each of which one tube T is inserted.

The articulated arm 12 comprises a 1st arm member 13, which can be pivoted about a rotary axis X1, which is constituted at the lower end of the 1st arm member 13. At the opposite upper end, the 1st arm member 13 is connected in an articulated manner to a 2nd arm member, wherein the 2nd arm member 23 can be rotated relative to the 1st arm member 13 about a rotary axis X2, which extends parallel to the rotary axis X1.

The 2nd arm member 23 is connected in an articulated manner with a sleeve part 24, which can be pivoted about a rotary axis X3 relative to the 2nd arm member 23. The rotary axis X3 extends parallel to the rotary axes X1 and X2.

A bow-like holding member 17 is mounted in the sleeve part 24 and can rotate about an axis D, which extends vertically with respect to the rotary axis X3. The holding member 17 has a holding device 18 with two suction elements 28, which are spaced apart from each other.

The set-down location A is constituted by a conveyor belt 34, which comprises a multiplicity of adjacently disposed resting parts 32, on each of whose upper sides a receptacle is disposed, into each of which a tube can be placed. In the illustrated example, the receptacles are constituted by slots 23, however, vertical dividing walls or webs can also be provided.

The transfer of a tube T in its individual phases is explained below by means of FIGS. 7 to 10.

Firstly, the articulated arm 12 is positioned such that the suction elements 28 make contact with the lateral surface of the tube T, which is still located in the tube holder 19. On the side of the tube T facing away from the suction elements 28 there is a contact surface 27, which prevents the tube T from slipping backward when it is gripped. The tube T is gripped by activating the suction elements 28. At the same time or directly beforehand, the tube is lifted out of the tube holder 19 (FIG. 7) and the articulated arm 12 is actuated in such a way that the tube T is transported to the set-down location A (FIGS. 8 and 9). At the same time, the holding member 17 is rotated about the axis D, which either coincides with the longitudinal axis L of the tube or extends parallel thereto. In this way, it is possible to align the tube T in such a way that it is inserted from above into one of the slots 33 of the conveyor device 34, as is shown in FIG. 10. During this operation, the tube T can be rotated about its longitudinal axis so that the rear sealing and folding edge of the tube T lies diagonally in the slot 33 and is thus correctly aligned for later insertion into a carton.

The embodiment of the transfer device according to FIG. 11 differs from the transfer device according to FIG. 7 only in that two articulated arms 12 of the same construction are provided, each of which have a frame-like holding member 17 with two suction elements 28. The two articulated arms 12 are connected and coupled to each other by means of a connecting rod 35, so that the holding members 17 are moved jointly. In this way, it is possible to simultaneously remove two tubes T from tube holder 19 at the staging location B and to insert each of them into a slot 33 of the conveyor belt 34 at the set-down location A.

A further variant of this embodiment is shown in FIG. 12, wherein three parallel aligned holding members 17, each having two suction elements 28, are provided on connecting rod 35. Because the articulated arms 12 are connected via the connecting rod 35, the articulated arms 12 are pivoted jointly, wherein the holding members 17 rotate in synchronism about the respective axis D.

In this way, it is possible simultaneously to pick up three tubes at the staging location and to deposit them at the set-down location.

With the embodiments shown in FIGS. 11 and 12, it is possible to change the mutual spacing between the tubes during transfer. This is necessary if the mutual spacing between the tubes in the successive tube holders and the mutual spacing between the tubes in the downstream conveyor device 34 differs. The mutual spacing can be changed by rotating the tubes, not about their longitudinal axis L, but about the offset parallel axis D.

We claim:

1. A method for transferring a tube in a tube filling machine, the tube having a longitudinal tube axis, wherein the tube filling machine has a staging location and a set-down location as well as a multiple-member articulated arm having at least one first arm member structured to pivot about a rotary axis and a holding member which is mounted in a pivotable manner directly or indirectly to the first arm member, the holding member bearing at least one holding device, the method comprising the steps of:
   a) disposing the tube in horizontal orientation at the staging location;
   b) grasping, using the holding device, an outer surface of the tube with the tube thereby being in horizontal orientation at the staging location;
   c) transporting the tube from the staging location to the set-down location;
   d) pivoting, during step c), the tube together with the articulated arm about the rotary axis;
   e) rotating, during step c), the tube about the longitudinal tube axis or about an axis running parallel thereto by pivoting the holding member relative to the first arm member; and
   f) dispensing, following steps d) and e), the tube in vertical orientation at the dispensing location.

2. The method of claim 1, wherein the tube is grasped by the holding device at at least two regions, which are spaced apart in a longitudinal direction of the tube.

3. The method of claim 1, wherein the pivoting about the rotary axis in sted d) is through an angle of 90 degrees.

4. The method of claim 1, wherein the rotary axis is perpendicular to the longitudinal tube axis, or to the axis parallel thereto.

5. The method of claim 3, wherein the rotary axis is perpendicular to the longitudinal tube axis, or to the axis parallel thereto.

6. The method of claim 1, wherein the holding device acts on an upper side of the tube in step b).

7. The method of claim 1, wherein the tube is held by means of a suction device at the set-down location.

8. The method of claim 1, wherein the tube is held above a tube holder at the set-down location and is inserted from above into the tube holder.

* * * * *